Feb. 6, 1934.   M. SCOTT   1,945,660
INSTRUMENT FOR DETERMINING ATMOSPHERIC CONDITIONS
Filed June 15, 1931   3 Sheets-Sheet 1

Inventor
Merit Scott,
by
Bryant
Attorney.

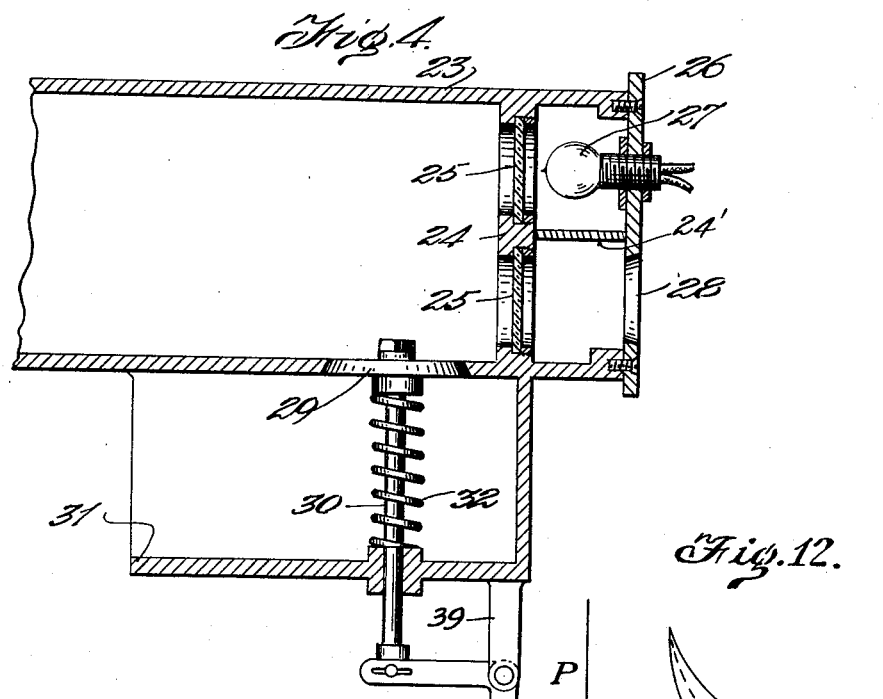
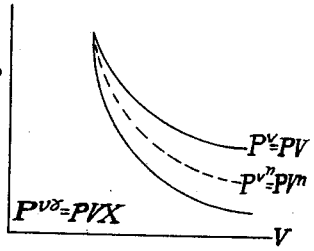
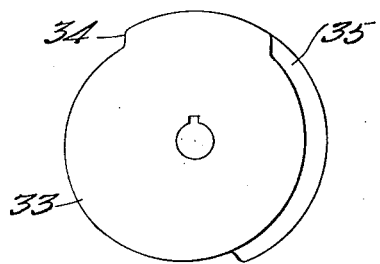
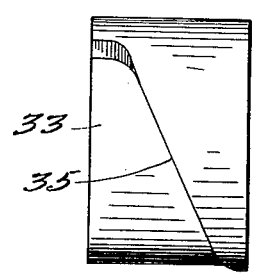
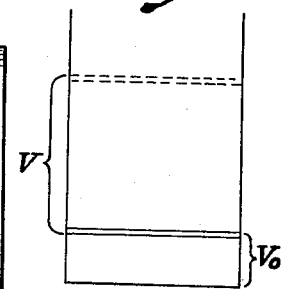

Feb. 6, 1934. M. SCOTT 1,945,660
INSTRUMENT FOR DETERMINING ATMOSPHERIC CONDITIONS
Filed June 15, 1931 3 Sheets—Sheet 3

Inventor
Merit Scott,
by
M. Bryant
Attorney

Patented Feb. 6, 1934

1,945,660

UNITED STATES PATENT OFFICE 1,945,660

INSTRUMENT FOR DETERMINING ATMOSPHERIC CONDITIONS

Merit Scott, Ithaca, N. Y.

Application June 15, 1931. Serial No. 544,567

10 Claims. (Cl. 73—24)

This invention relates to an instrument for determining atmospheric conditions and has special reference to an instrument for detecting humidity in the atmosphere in excess of a predetermined amount, the instrument being preferably termed a humidity meter.

Instruments for the purpose of determining the relative moisture content of the atmosphere are not new and there are two general types of such instruments, one of which works by evaporation and the other by absorption. Typical of evaporation instruments is the well known wet and dry bulb thermometers, the difference in the reading of the two thermometers affording a basis for determining the moisture content of the surrounding air. Typical of the absorption instruments is the hair hygroscope wherein a hair is used to move a pointer over a scale calibrated to indicate moisture content or the like, the hair expanding and contracting lineally in accordance with the humidity changes. In both of these types, which embody practically all existing instruments in actual use, the reaction to changes in humidity is extremely slow so that such instruments cannot be used in the event that it is necessary to promptly determine humidity.

For certain purposes prompt determination of excessive humidity is essential. For instance, it is desirable, in aerial navigation, to avoid regions of high or excessive humidity and to leave such regions as may be encountered very promptly. This is because in regions of high humidity water is deposited on the aircraft and, where low temperatures prevail, forms ice which weights the ship down, destroys the wing contours of airplanes and produces results leading to impairment of the navigability of the ship and frequently causing serious accidents. If the pilot had prompt information of such high humidity he could so navigate the aircraft to at once leave the region in which such humidity occurs. There are many other commercial applications requiring determination of humidity without time lag.

It has been demonstrated that if a volume of air having a humidity content above a definite point and a temperature below a definite point be suddenly rarified, a fractional part of the humidity is condensed and forms a cloud or nebula easily detected by ocular observation.

The principal object of the present invention is to produce an instrument of novel character wherein such nebulization of humid air may be caused to take place whenever the instrument is employed in a region in which the humidity is in excess of a predetermined ratio to the air and wherein this nebulization may be readily observed.

A further object of the invention is to provide a novel instrument acting on this principle wherein charges of air will be automatically drawn in, rarified and expelled in rapid succession and wherein the effect produced by the rarification of such charges may be constantly under observation.

With the above and other objects in view, the invention consists in general of certain novel details of construction and combination of parts hereinafter fully described, illustrated in the accompanying drawings and specifically claimed.

In the accompanying drawings, like characters of reference indicate like parts in the several views, and:—

Figure 4 is an enlarged detail section on the line 4—4 of Figure 1;

Figure 5 is a detail end view of a certain cam used herewith;

Figure 6 is a detail side elevation of this cam;

Figure 7 is a side elevation, partly in section of a modified form of the invention;

Figure 8 is a plan view of the modified form;

Figure 9 is a detail section on the line 9—9 of Figure 7; and

Figure 10 is an enlarged detail section on the line 10—10 of Figure 8.

Figures 11 and 12 are certain mathematical diagrams hereinafter referred to in the explanation of the operation of the device.

Figure 1:
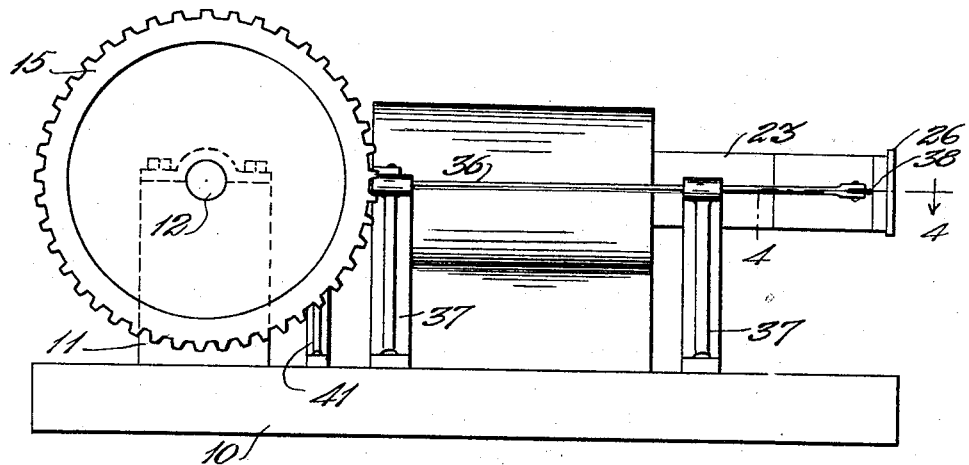
Figure 1 is a side elevation of one form of the invention.

In both forms of the invention as here shown there is provided a base 10 and bearing standards 11 rise from the base adjacent one end and support a crank shaft 12 having crank disks 13 connected by a crank pin 14. Suitable driving means is provided for the shaft 12, here indicated as a gear wheel 15, and such driving means may be operatively connected to an aeroplane engine, a wind motor or any other power source found convenient or desirable. A cylinder 16 is provided in the instrument and in this cylinder works a piston 17 of the hollow type used on an internal combustion engine, this piston being connected to the crank pin 14 by a connecting rod 18. In the closed end of the piston is an outwardly opening exhaust valve 19 which has a stem 20 working through a guide yoke 21 secured to the head. This valve is normally held closed by a spring 22 in the usual manner. A chamber 23 projects from the closed end of the cylinder 16 and communicates freely therewith, this chamber being of considerably smaller cross-sectional area than the cylinder 16. In the forward end of this chamber is a partition 24 having a pair of openings therein each closed by a glass window 25 in such manner as to seal this end of the chamber or casing 23 hermetically. The forward end of the chamber is closed by a plate 26 carrying a lamp 27 which lies in front of one window 25 while a sight opening 28 is provided in front of the other window 25. A partition 24' divides the lamp chamber from the sight chamber. In the side wall of this chamber, adjacent its forward end, is an outwardly opening inlet valve 29 provided with a stem 30 which passes through a housing or bracket 31 and this valve is normally held closed by a spring 32.

Figure 2:
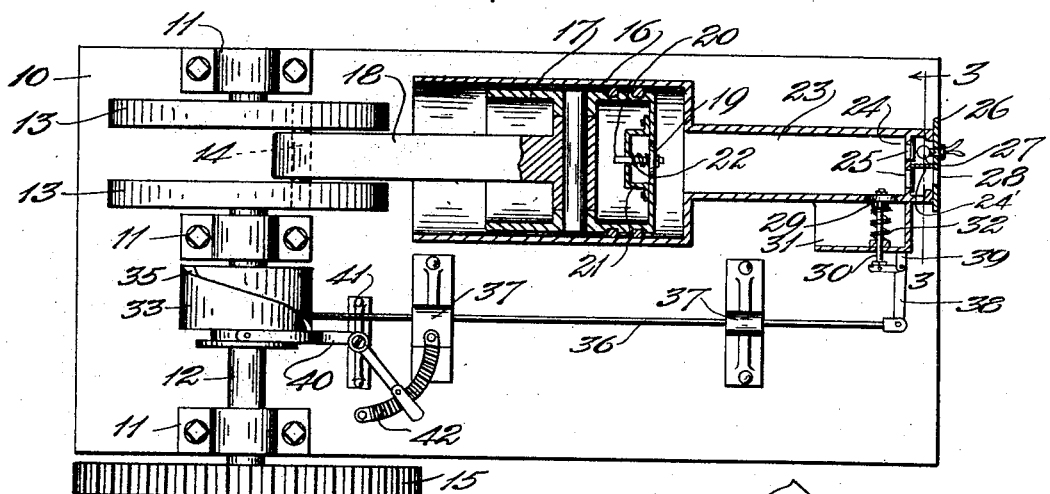
Figure 2 is a plan view of this form, partly in section to show certain working parts.
Figure 3:
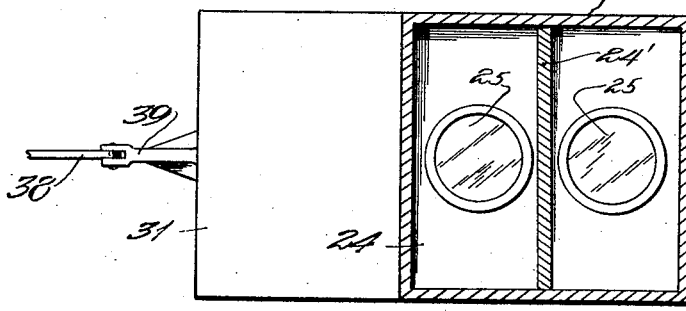
Figure 3 is an enlarged detail section on the line 3—3 of Figure 2.

In the form shown in Figures 1 to 6 of the invention, a variable cam is splined on the shaft 12 and this cam has a body 33 whereon is formed a valve opening shoulder 34 extending parallel to the axis of the cam, and a valve closing shoulder 35 extending spirally about the cam. A push rod 36 bears at one end against the cam and passes through guides 37 fixed on the base 10. The other end of this push rod has pin and slot connection with one arm of a bell crank 38 pivoted at its angle to a bracket 39 and having its other arm connected to the stem 30 by a pin and slot connection. A shipper lever 40 is pivoted on a bracket 41 mounted on the base 10 and engages the cam to move the same longitudinally of the shaft 12. The handle of this lever works over a serrated quadrant 42 fixed to the adjacent guide 37 and the shipper lever is thus held in adjusted position. In this form of the invention the cylinder 16 is fixed rigidly on the base. The purpose of the quadrant 42 is to indicate the position of cam 33 and to hold it in set position. Obviously this quadrant may be calibrated.

In the form of the invention shown in Figures 7 to 10, the cylinder is slidably mounted on the base 10 by means of a leg 43 having a dovetailed foot 44 working in a corresponding groove formed in the base. A bracket 45 is mounted on the base and carries an adjusting screw 46 which screws into the leg and thereby adjusts the cylinder. In this form, a longitudinal shaft 47 is supported in bearings 48 and is geared to the shaft 12 by miter gears 49. On its forward end this shaft carries a cam 50. This cam may be of the same type as the one previously described but with a more slightly inclined cam shoulder or may have a straight cam shoulder. The valve stem 30 is provided with a semi-circular extension 51 which extends over and around the cam 50 and is provided with a roller 52 rolling on said cam.

In the first form, the closing of the valve is varied by shifting the cam on shaft 12 while in the second form the closing of the valve may be varied by shifting the position of the cylinder and thus moving the roller 52 longitudinally of the cam 50. Obviously, varying of the time the valve is open will vary the volume of external air (the charge) admitted. As the piston moves to the left of the figures shown, and since the area of cylinder 16 is so great in comparison to the cross-section of chamber 23, the admitted charge will undergo considerable rarification and, if the admitted charge is higher in humidity than that for which the instrument is set by adjustment of the intake valve closing, a cloud will form in the chamber 23 which may be observed through the sight opening 28. Obviously, this observation of the cloud may be had by direct vision or by the medium of an apparatus suitable to detect light variations such as a device embodying a photoelectric cell. Obviously, also such a light detecting apparatus may be of a recording type. This is mentioned here to explain the wide utility of the invention but such light detecting apparatus is not here shown nor described since the same forms no part of the present invention and old and well known types of apparatus suitable for this use are commercially available.

In the second form of the invention, the intake valve may open and close at fixed intervals in which case the variation is dependent on the working capacity of the cylinder. In this form, the difference in expansion ratio is obtained simply by sliding the cylinder, for by this the ratio of the volume of air with the piston at the extreme right to that with the piston at the extreme left of the drawings is varied. If a variable surface cam is used the range may be increased or decreased according to the construction of the cam surface.

The operation cycle is as follows: With the piston to the extreme right, the intake valve opens. The piston moves to the left and, according to the setting, the intake valve closes. Further movement of the piston to the left rarifies the charge admitted and this rarification continues until the piston has reached its extreme left position and starts to the right. As the piston moves to the right it reaches the point at which the intake valve closed in its movement to the left and at this instant the charge is at atmospheric pressure. Further movement to the right results in opening of the exhaust valve and this valve remains open until the piston reaches its starting position so that the cycle may start all over, the exhaust valve closing at the end of the cycle. In operation, it is found advisable to cause the cycle to be performed with sufficient rapidity to effect expansion of the air in approximation to an adiabatic expansion.

It is to be noted that the cloud begins to form at the dew point and the lowering of the temperature by rarification is proportional to the expansion ratio and to the speed of expansion. Thus for setting the instrument, either the cam position may be used to regulate the expansion ratio or the speed may be varied. Obviously, the instrument may be calibrated by comparison with standard dew point hygrometer in a laboratory.

Three general methods of use are available with these instruments. By one method the instrument may be set to produce a cloud only under definite conditions of humidity so that cloud production indicates that such conditions have been reached or exceeded. By the second method, the instrument is set to produce a cloud at a point of humidity greatly below that to be avoided and the densities of the clouds produced are observed, the more humid the air the greater the density, until a point is reached at which the observed density indicates the pressure or approach of maximum permissible humidity. A third and in all probability the most precise method and the one best adapted to recording purposes is the null method. In this method the expansion ratio is varied until the cloud is just visible, otherwise just extinguished, and the expansion ratio, either observed or recorded as the position of the cam as in instrument one or the position of the cylinder in instrument two, is the measurement of the humidity, or more precisely the departure of the dew point from the air temperature. Obviously, a thermometer may be used for accurate determination of the dew point although the instrument may be calibrated on the cam setting means to operate with a sufficiently close approximation to truth for practical use at or near the temperature at which it is expected to use the device.

The theory and operation of the device will be fully understood from what now follows.

Let there be a cylinder provided with a piston that may be actuated therein, and let means be provided whereby air may be admitted to the cylinder and its volume varied from $V_o$ the original volume to $V$ its final volume, as shown in Figure 11. The expansion of the air from $V_o$ to $V$ may occur indefinitely slowly along an isothermal, indefinitely fast along an adiabatic, or along some intermediate curve as shown in Figure 12.

In the case of the expansion along the general curve, experience with engine cycles teaches that the curve may be specified by:

$$pv^n = PV^n$$

where $p$, $P$ are the pressures of the air, and $v$, $V$ its corresponding volumes. $n$ is a constant in general less than the ratio of the specific heat at constant pressure to the specific heat at constant volume, but approaching this value as the cycle approaches the adiabatic condition of expansion.

When expansion of the air occurs along the general curve, cooling of the gas accordingly takes place. The amount of this cooling may be calculated by application of the first law of thermodynamics, which implies the law of conservation of energy, and may be stated in this manner:

$$dH = mc_v dt + pdv + dW$$

where $dH$ is an increment of heat added to the gas $m$ the mass of the gas $c_v$ the specific heat of the gas at constant volume $dt$ is an increment of temperature $p$ is the pressure of the gas $dv$ an increment of volume $dW$ an increment of internal work.

The mass of gas admitted to the cylinder is $m_o = \rho_o V_o$. $dw$ may be omitted, as air is sufficiently perfect as a gas over the practical range in question. Use shall be made also of the general gas law, which may be stated as follows:

$$pv = mRT \text{ or } p/\rho = RT$$

In the above:

$\rho_o$ is the density of the admitted gas $\rho$ is the density of the gas in general $R$ is the gas constant $T$ is the absolute temperature.

Let $c_x$ be the specific heat of the air along the general curve, then the above principle and facts may be combined as follows: It is necessary to integrate over the expansion of the gas from $V_o$ to $V$, and $m_o c_x dt$ is substituted for $dH$.

$$\rho_o V_o c_x dt = P_o V_o c_v dt + pdv$$
$$\rho_o V_o (c_x - c_v) dt = pdv$$

Integrate and set $\Delta t$ for the total lowering of the air temperature.

$$\rho_o V_o (c_x - c_v) \Delta t = P_o V^n_o \int \frac{V_{dv}}{V_o V^n}$$

$$\Delta t = \frac{P_o V^{n_o - 1}}{\rho_o (c_x - c_v)} \int \frac{V_{dv}}{V_o V^n}$$

Finally:

$$\Delta t = \frac{RT_o}{(c_x - c_v)} K(V_o, V) \quad \text{(Equation 1)}$$

where $K(V_o, V)$ is a function of the initial and final volumes, that is $K$ is a constant for any given set of these values. Also it has been implicitly assumed that $c_x$ and $c_v$ are constants, that is, independent of temperature and pressure, $x$ as indeed they are over a very wide range, as may be learned from any comprehensive text on the subject.

The result of this calculation is that the lowering in temperature of the air upon expansion is independent of the air pressure and density, but is directly proportional to the absolute temperature of the admitted air for any given set of values for $V_o$ and $V$.

Observations carried out by the United States Weather Bureau by means of recording instruments mounted upon airplanes flown on regular schedule have shown that ice formation occurs whenever the temperature is within the range 0° C. to −25° C. and when at the same time the relative humidity is fairly close to 100%, probably 90% or more. So far as I know the exact boundaries of the ice hazard zone are not known, and those as specified above must serve as our present guide. It is clear that a statement of relative humidity is the equivalent of a corresponding statement of dewpoint departure, that is the departure of the dewpoint temperature from that of the air. Now the ice hazard zone may thus be specified as defined by a given dewpoint departure, say 2° C., and lacking further information, we may suppose that this zone is of the same width from 0° C. to −25° C., although there is good reason to believe, I feel, that the zone narrows considerably at the lower temperatures. This remains to be understood.

The above specifies the range of the variables in which any ice indicator must function, and any design must be based upon these figures, at least for the present.

In the discussion given above on the expansion of the air, it is now to be noted that dry air was considered. If the air were not dry, there would be further terms, an examination of which would reveal that in the range given above these additional terms would add nothing to the result. For, $$\rho_o c >> \rho_o' c' >> \text{means large in comparison with}$$
$$p >> p'$$

where the unprimed refer to the air as before and the primed to the water vapor present in the air. The order of comparison is given by the following sets of values, taken for 0° C.

$$c = .2375$$
$$c' = .46$$
$$p = 760 \text{ mm. of Hg.}$$
$$p' = 4 \text{ mm. of Hg.}$$
$$\rho o = 1.293 \; 10^{-3}$$
$$\rho o' = 4.847 \; 10^{-6}$$

The conclusion is reached therefore that throughout the ice hazard zone, independent of air pressure and density, the lowering of the air temperature upon expansion as specified is directly proportional to the absolute temperature.

The device, as specified in the present specification, fulfills the requirements of the above theoretical discussion. The following remarks specifically refer to the first design given, but may be understood to be applicable to the second as well. The constant $K$ of the above equation 1 is fixed by any setting of the cam, for thereby the values of $V_o$ and $V$ are determined.

Let the cam be adjusted for that position which produces flicker, due to the presence of cloud, at 0° C. when the relative humidity is say, 85%, that is, to correspond to a dewpoint departure of say 2° C. Then since the absolute temperature varies 25/273 or 9% over the ice forming region, the dewpoint departure at which flicker first appears at −25° C. will be 9% less than 2° C. or 1.8° C. Or, the device may be set to give the fixed value of departure at the middle of the range, say at −12.5° C., then the variation in the dewpoint departure at which flicker sets in will vary only 4.5% over the ice forming range of temperature, that is from say 2° C. at −12.5° C. to 2.1° C. at 0° C. at 1.9° C. at −25° C. In any case, it is to be emphasized that the instrument can not fail to give proper warning when once the ice hazard zone has been practically bounded, and the instrument set to correspond.

If a thermometer is at hand, it is clear that the departures given by the device may be quickly corrected by a glance at the thermometer, as the variation is small over the entire range of operation of the airplane, and the simple fractional correction is easy to make, even as the pilot must correct the airspeed meter readings for altitude.

Let it be supposed that the device is set as described above. The use may be pictured somewhat as follows: The pilot observes that the temperature is dropping, it is approaching 0° C., and he cuts in the device. At 0° C. a weak flicker appears, and he realizes that the dewpoint departure is about 2° C., and ice is about to form: he changes his course upward or downward, to right or left seeking a region wherein the departure may be greater and wherein he may safely continue his flight. The flicker becomes stronger, and he knows that the ice hazard is upon him, he must act quickly now, either to seek a landing, or to put any protective devices into operation. He notes perhaps that the temperature has now dropped to −15° C., at which point he knows that the flicker occurs at a slightly smaller departure, and with experience it is clear that it must be possible to learn more clearly what the boundaries of the ice hazard are and what the instrument indications mean in their relation to the continuation of safe flight.

Now, again, suppose that the thermometer reads, say −10° C., the device has been cut in but there is no flicker; the pilot however seems to be flying in thick weather and thinks that the danger of ice is great. By moving the cam, the dewpoint departure at which cloud first appears may be increased and the pilot may find that this occurs at a certain reading of the cam position, which is labelled 3° C., that is the departure would be 3° C. when flicker first set in provided the temperature were 0° C. He makes the slight correction and knows that his feelings were wrong, that there is no immediate danger of ice formation. The cam position is then returned to the standard setting.

Apparently the actual density of water droplets in the atmosphere, and these are the source of ice formation as we have now learned, increases rapidly as the dewpoint departure decreases toward 0° C., that is as the relative humidity increases from say 85% toward 100%. It is clear then that after the weak flicker has appeared in the instrument to indicate the development of the ice hazard any increases in the intensity of the flicker indicates an accelerated rate of formation of the ice upon the plane surfaces.

There has thus been provided a simple and efficient device of the kind described and for the purpose specified. It is obvious that changes may be made in the form and construction of the invention without departing from the principles thereof. It is not, therefore, desired to confine the invention to the exact form herein shown and described but it is desired to include all such as come within the scope claimed.

Having thus described the invention, what is claimed is:—

1. An instrument for indicating the proximity of dewpoints in gases and including an expansion chamber, means to admit successive measured charges of a gas into said chamber, means to produce a sudden rarification of each charge admitted, means to exhaust each charge from the chamber after rarification, and a sight window in a wall of said chamber wherethrough the contents of the chamber may be observed.

2. An instrument for indicating the proximity of dewpoints in gases and including an expansion chamber, means to admit successive measured charges of a gas into said chamber, means to produce a sudden rarification of each charge admitted, means to exhaust each charge from the chamber after rarification, means to regulate the volumes of the admitted charges at will, and a sight window in a wall of said chamber wherethrough the contents of the chamber may be observed.

3. An instrument for indicating the proximity of dewpoints in gases and including an expansion chamber, means to admit successive measured charges of a gas into said chamber, means to produce a sudden rarification of each charge admitted, means to exhaust each charge from the chamber after rarification, a sight window in a wall of said chamber wherethrough the contents of the chamber may be observed, and means to illuminate the interior of said chamber.

4. An instrument for indicating the proximity of dewpoints in gases and including an expansion chamber, means to admit successive measured charges of a gas into said chamber, means to produce a sudden rarification of each charge admitted, means to exhaust each charge from the chamber after rarification, means to regulate the volumes of the admitted charges at will, a sight window in a wall of said chamber wherethrough the contents of the chamber may be observed, and means to illuminate the interior of said chamber.

5. An instrument for indicating the proximity of dewpoints in gases and including an expansion chamber, an inlet valve to admit successive measured charges of a gas into said chamber, means to produce a sudden rarification of each charge admitted, means to exhaust each charge from the chamber after rarification, means to regulate the length of time said inlet valve remains open, and a sight window in a wall of said chamber wherethrough the contents of the chamber may be observed.

6. An instrument for indicating the proximity of dewpoints in gases and including an expansion chamber, an inlet valve to admit successive measured charges of a gas into said chamber, means to produce a sudden rarification of each charge admitted, means to exhaust each charge from the chamber after rarification, means to regulate the length of time said inlet valve remains open, a sight window in a wall of said chamber wherethrough the contents of the chamber may be observed, and means to illuminate the interior of said chamber.

7. An instrument for indicating the proximity of dewpoints in gases and including an expansion chamber, an inlet valve to admit successive measured charges of a gas into said chamber, means to produce a sudden rarification of each charge admitted, means to exhaust each charge from the chamber after rarification, means to operate said inlet valve including a constantly rotating cam and a valve operating member engaging said cam, said cam having a valve opening shoulder arranged to effect opening of the valve at a fixed point in the rotation of the cam and a spiral valve closing shoulder, means to vary the position of said member longitudinally of the cam, and a sight window in a wall of said chamber wherethrough the contents of the chamber may be observed.

8. An instrument for indicating the proximity of dewpoints in gases and including an expansion chamber, an inlet valve to admit successive measured charges of a gas into said chamber, means to produce a sudden rarification of each charge admitted, means to exhaust each charge from the chamber after rarification, means to operate said inlet valve including a constantly rotating cam and a valve operating member engaging said cam, said cam having a valve opening shoulder arranged to effect opening of the valve at a fixed point in the rotation of the cam and a spiral valve closing shoulder, means to vary the position of said member longitudinally of the cam, a sight window in a wall of said chamber wherethrough the contents of the chamber may be observed, and means to illuminate the interior of said chamber.

9. An instrument for indicating the proximity of dewpoints in gases and including an expansion chamber, means to admit successive measured charges of a gas into said chamber, means to produce a sudden rarification of each charge admitted, means to exhaust each charge from the chamber after rarification, and a sight window in a wall of said chamber wherethrough the contents of the chamber may be observed, and means to vary the rarification ratio at will.

10. An instrument for indicating the proximity of dewpoints in gases and including an expansion chamber, means to admit successive measured charges of a gas into said chamber, means to produce a sudden rarification of each charge admitted, means to exhaust each charge from the chamber after rarification, a sight window in a wall of said chamber wherethrough the contents of the chamber may be observed, means to illuminate the interior of said chamber, and means to vary the rarification ratio at will.

MERIT SCOTT.